United States Patent [19]

Steiner et al.

[11] Patent Number: 4,650,167

[45] Date of Patent: * Mar. 17, 1987

[54] VIBRATION DAMPER

[75] Inventors: Heinz Steiner, Neuhausen am Rheinfall, Switzerland; Fritz Knoll, Konstanz, Fed. Rep. of Germany

[73] Assignee: SIG Schweizerische Industrie-Gesellschaft, Neuhausen am Rheinfall, Switzerland

[*] Notice: The portion of the term of this patent subsequent to Dec. 17, 2002 has been disclaimed.

[21] Appl. No.: 776,507

[22] Filed: Sep. 17, 1985

Related U.S. Application Data

[63] Continuation of Ser. No. 471,534, Mar. 2, 1983, Pat. No. 4,558,852.

[30] Foreign Application Priority Data

Mar. 11, 1982 [CH] Switzerland ............... 1506/82

[51] Int. Cl.⁴ ........................................ F16F 15/08
[52] U.S. Cl. ........................................ 267/137; 188/380
[58] Field of Search ............... 188/268, 378, 379, 380, 188/382; 267/75, 136, 137, 140.1, 140.3, 141, 141.1, 152, 153, 63 R; 74/572, 574; 138/137; 173/139, 162 R, 162 H; 16/DIG. 6; 248/559, 636

[56] References Cited

U.S. PATENT DOCUMENTS

| 3,845,827 | 11/1974 | Schulin ............... 188/268 X |
| 3,968,843 | 7/1976 | Shotwell ............... 267/137 |
| 4,154,266 | 5/1979 | Tanaka et al. ............... 138/137 X |
| 4,364,293 | 12/1982 | Hirsch ............... 267/137 X |
| 4,385,665 | 5/1983 | Knoll ............... 188/379 X |
| 4,558,852 | 12/1985 | Steiner et al. ............... 267/137 |

FOREIGN PATENT DOCUMENTS

| 207035 | 3/1957 | Australia ............... 188/380 |
| 52-50478 | 4/1977 | Japan ............... 188/378 |
| 243079 | 11/1925 | United Kingdom ............... 267/63 R |
| 648720 | 1/1951 | United Kingdom ............... 267/141 |
| 1421032 | 1/1976 | United Kingdom . |

Primary Examiner—Andres Kashnikow
Assistant Examiner—Richard R. Diefendorf
Attorney, Agent, or Firm—Spencer & Frank

[57] ABSTRACT

A vibration damper comprises a housing defining a cavity; a damping mass accommodated for oscillation in the cavity between wall surfaces; and spring elements situated on two opposite sides of the damping mass. Each spring element is in engagement with the damping mass and a respective one of the wall surfaces for positioning the damping mass in the cavity. Each spring element has a shape selected to confer to the spring element a dynamic deformation behavior characterizing spherical bodies. Further, the spring elements, as viewed together, are arranged at least approximately symmetrically with respect to a central axis of the damping mass oriented parallel to the path of oscillation. The vibration damper also includes an arrangement for guiding the damping mass linearly along the path of oscillation.

3 Claims, 22 Drawing Figures

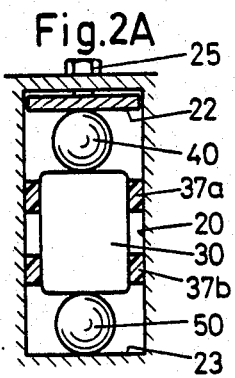
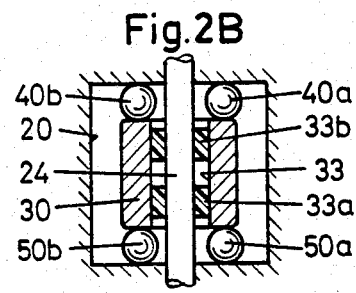
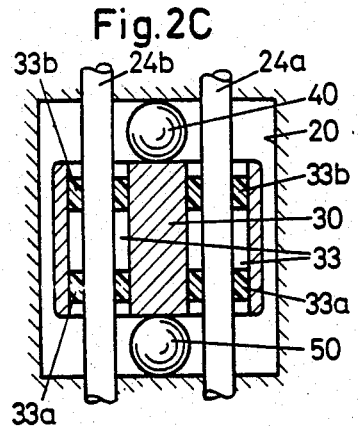
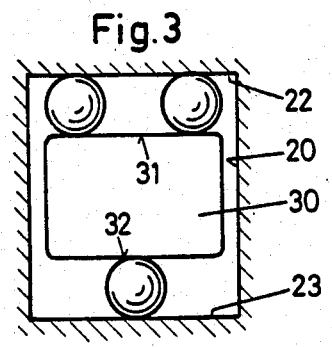
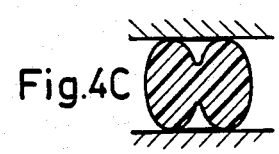
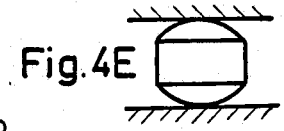
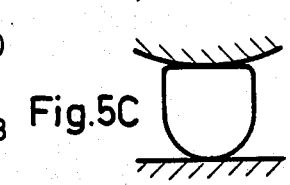
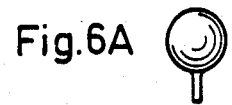
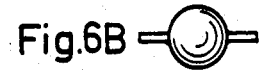
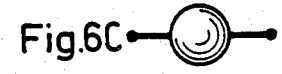
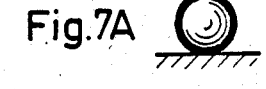
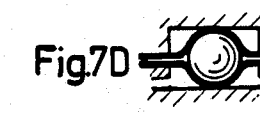

VIBRATION DAMPER

This is a continuation of application Ser. No. 06/471,534, filed Mar. 2nd, 1983, now U.S. Pat. No. 4,558,852 issued Dec. 17th, 1985.

BACKGROUND OF THE INVENTION

This invention relates to a vibration damper which includes a damping mass supported in an at least partially closed housing by means of at least two spring elements.

Vibration dampers for reducing the vibrational energy in power hammers or drills are known. Such a device is described, for example, in British Pat. No. 1,421,032. According to this patent, a damping element (damping mass) is supported by means of spring elements at the inner wall of a bore provided, for example, in drilling rods or in a cavity of a housing to be attached to a machine whose vibrations are to be damped. The damping element is supported by the spring elements in such a manner that the spring elements are in contact with the damping element as well as with the oppositely located end walls (impact faces) of the bore or cavity. Further, a mechanism is provided for axially adjustably compressing the spring elements in order to vary their stiffness. At least one of the end walls or the end face of the spring element is—as viewed in an uncompressed state—of conical shape and defines a wedge-shaped gap when no compression force is applied. By means of this arrangement both the damping force and the spring force may be adjusted. While, from the theoretical point of view, the efficiency of such an arrangement is undisputed, difficulties are involved with its technical realization, because in using a rubber member for the spring elements there is generated a friction between the associated impact face of the bore and the surface of the spring element. This occurrence leads to a wear of the spring element. The friction could be reduced by lubrication which, however, is not feasible in case of certain elastomers. Further, polybutadiene would be otherwise an appropriate material as concerns the dynamic deformation behavior; such materials, however, are not oil-resistant.

U.S. Pat. No. 3,968,843 discloses an improvement with respect to the arrangement described in the above British patent. An elastic damping member is arranged between a vibrating tool and a handle and is provided with throughgoing air supply channels. Further, an oil-resistant, one-piece elastic lining is provided on the walls of the air supply channels. This arrangement prevents oil carried with the compressed air from contacting the rubber material of the damping member. Further, the lining is used on either side of the damping member for sealing the air supply channels. Such an arrangement may yield advantageous results in certain instances, particularly where the damping member or, as the case may be, the spring element is secured at both sides and no relative displacements whatever are allowed between the damping mass and the spring element on the one hand, and between the spring element and the handle on the other hand, as it should be the case between the tool and its handle.

SUMMARY OF THE INVENTION

It is an object of the invention to provide an improved vibration damper of the above-outlined type in which the vibrational energy is not absorbed by a spring element but is transferred by such spring element to a rigid damping mass so that the latter is caused to oscillate for damping the vibration intended to be reduced.

This object and others to become apparent as the specification progresses, are accomplished by the invention, according to which, briefly stated, the vibration damper has a damping mass supported by at least two spring elements, each being shaped such as to have a deformation behavior corresponding to that of spherical bodies and further, means are provided to guide the damping mass linearly at least along the displacement path of the vibration. Further, the spring elements, viewed in their entirety, are at least approximately symmetrical with respect to the axis of oscillation of the damping mass.

The vibration damper according to the invention thus constitutes a spring-and-mass system whose natural frequency is capable to adapt itself to the exciting vibration. The components functioning as springs have dynamic deformation behavior properties of spherical bodies so that a more-than-proportional force/displacement characteristic results.

By using a soft-elastic material for the spring element which has a high degree of rebound elasticity and/or the property of low natural dynamic damping, a large proportion of the energy may be transmitted to the vibrating tool or machine component. Such a material may be rubber or an elastomer, for example, polybutadiene.

According to a further feature of the invention, for reducing the friction between the spring element and the impact face bounding the housing cavity and between the spring element and the damping mass, an envelope, made, for example, from chloroprene rubber, surrounds each spring element for protecting the latter against mechanical and/or chemical effects (corrosion) so that a lubrication may be performed to reduce friction. Preferably, the wall thickness of the envelope is less than 10% of the dimension of the spring element measured in the direction of vibration. The envelope may be provided with projections such as pins or diaphragm-like flat portions by means of which the spring element may be attached either to the housing or to the damping mass in order to maintain the spring element in position during deformation. Or, threaded nuts or eyelets may be embedded into the envelope for receiving screws or other securing means.

The division of a spring element unit into a resilient core body which may be selected according to favorable damping properties and an envelope which may be selected according to its resistance to lubricants and mechanical wear has further the advantage that the shape of the resilient core body may be freely selected between wide limits as long as it has a configuration that has dynamic deformation properties corresponding to those of spherical spring bodies.

The spring elements may have spherical, annular or tubular shape. For improving the intended deformation behavior, the impact faces of the vibrating body or those of the damping mass may be utilized to ensure a point contact, linear contact or surface contact with the spring element.

It is noted that the envelope need not conform closely to the spring element; it may loosely surround the latter. It is of significance, however, that the spring element be completely enclosed or encapsulated against destructive influences.

BRIEF DESCRIPTION OF THE DRAWING

FIGS. 2A, 2B and 2C are schematic sectional elevational views of three other preferred embodiments of a component of the invention.

FIG. 3 is a schematic sectional elevational view of a further preferred embodiment of the invention.

FIGS. 4A, 4B, 4C, 4D ahd 4E are sectional elevations of five variants of a component of the invention.

FIGS. 5A, 5B and 5C are elevational views of three variants of a component of the invention.

FIGS. 6A, 6B, 6C, 6D and 6E are elevational views of five variants of a component of the invention.

FIGS. 7A, 7B, 7C and 7D are sectional elevational views of four variants of a component of the invention.

DESCRIPTION OF THE PREFERRED EMBODIMENTS

Figure 1:
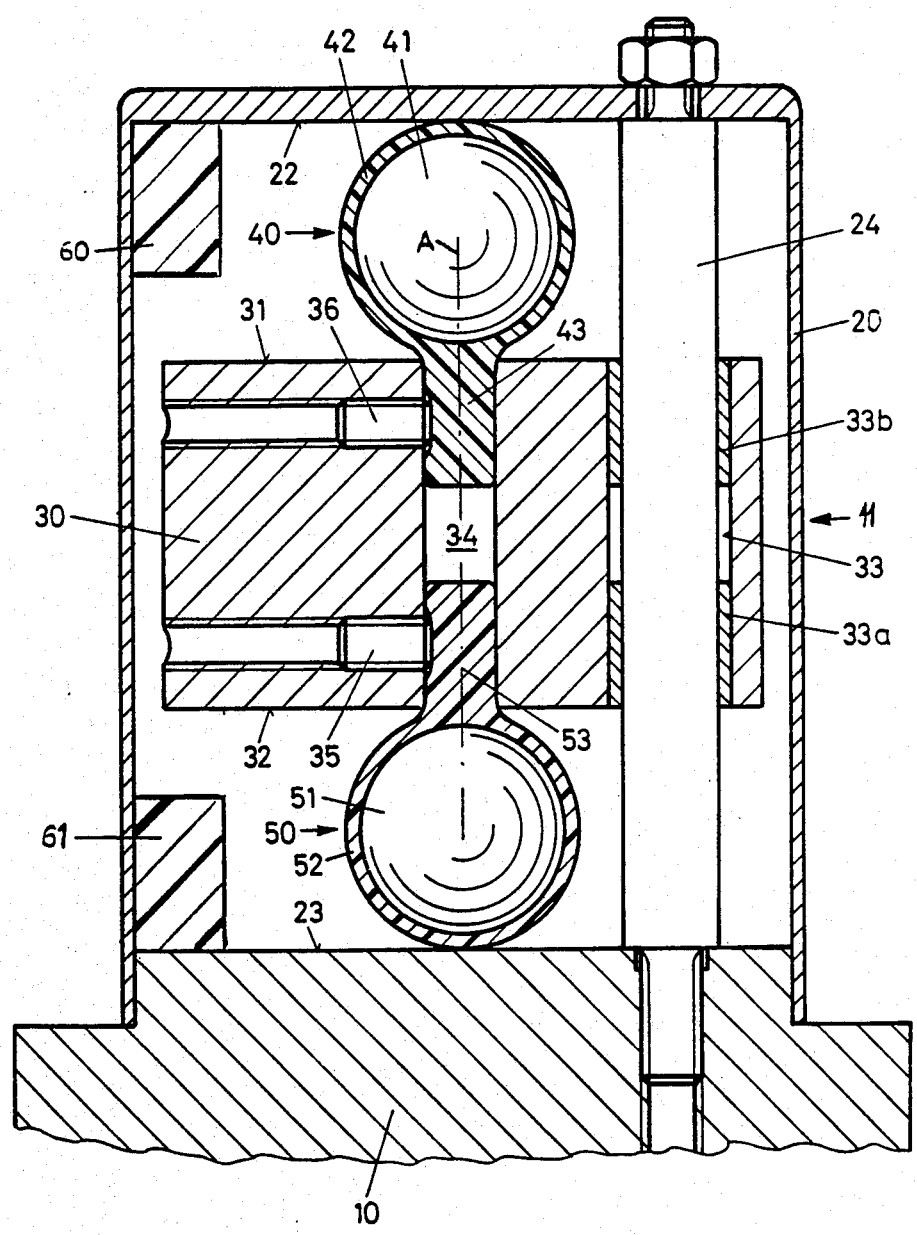
FIG. 1 is a sectional elevational view of a preferred embodiment of the invention.

Turning now to FIG. 1, there is shown a rear portion 10 of a vibrating body such as a pneumatic hammer, for example, of the type described in the earlier-mentioned U.S. Pat. No. 3,968,843. To the portion 10 there is externally mounted a vibration damper generally indicated at 11, structured according to the invention.

The vibration damper 11 comprises a damping mass 30 accommodated in a housing 20 and two spring elements 40 and 50 which are in engagement with surfaces 31 and 32 of the damping mass 30 and further engage an impact face 22 of the housing 20 and an impact face 23 of the vibrating body 10. The damping mass 30 has a throughgoing bore 33 in which there are positioned guide sleeves 33a and 33b which slide on a guide bar 24 positioned within the housing 20 and fixedly attached to the housing 20 and to the vibrating body 10. The bore 33 extends eccentrically with respect to and parallel with the axis A of the damping mass 30, oriented in the direction of the vibration path thereof.

In the embodiment illustrated in FIG. 1, the spring elements 40 and 50 comprise spherical springs (core bodies) 41 and 51 each embedded in a respective envelope 42 and 52. Each envelope 42 and 52 is provided with an integral, pin-like extension 43 and 53, respectively, immobilized by means of respective setscrews 35 and 36 in a second throughgoing bore 34 of the damping body 30. In the position of rest (inoperative state) the resultant of the forces exerted by the spring elements 40, 50 on the damping mass 3 positions the latter centrally with respect to its path of oscillation.

The spherical springs 41 and 51 are made of an elastomer such as polybutadiene and the envelopes 42 and 52 which have a thickness preferably not more than 10% of the diameter of the spring 41 or 51, are made of a wear-resistant and mineral oil-resistant chloroprene rubber.

The above arrangement ensures that, on the one hand, for the spherical spring the most suitable soft-elastic material for vibration damping may be selected and, on the other hand, for the envelope an oil-resistant material may be chosen so that optimal conditions with regard to wear resistance and aging of material may be provided.

The path of oscillation of the damping mass 30 parallel to the guide bar 24 is limited at opposite ends by resilient (e.g. rubber) buffer blocks 60 and 61 secured to the housing 20 adjacent opposite impact faces 22 and 23.

Turning now to FIGS. 2A, 2B and 2C, there are shown three different embodiments for guiding the damping mass 30 in the housing 21. According to FIG. 2A two slide rings 37a and 37b are provided which surround the damping mass 30 and whi,ch slide on the inner wall of the housing 20. Within the housing 20 there is arranged an adjustable impact face 22 which may be set with respect to the oppositely located stationary impact face 23 by means of a setscrew 25, whereby the spherical spring elements 40 and 50 may be biased (precompressed). It will be understood that such an adjustment of the impact face may be provided in all embodiments described.

FIG. 2B illustrates a guide bar 24 arranged centrally in the housing 20. The damping mass 30 has a throughgoing bore 33 which extends centrally with respect to the axis of the damping mass 30, oriented parallel to the vibration path thereof. The guide bar 24 passes through the bore 33 and is surrounded by guide sleeves 33a, 33b, supported in the bore 30. Since in the FIG. 2B embodiment the guide bar 24 assumes a central position with respect to the housing 20, there are provided two spring element pairs formed of springs 40a, 40b and, respectively, 50a, 50b, which, when viewed individually, are arranged eccentrically but, as a pair, are arranged symmetrically to the central axis of the damping mass 30, oriented parallel to the vibration path thereof.

Turning to the embodiment illustrated in FIG. 2C, in the housing 20 of the vibration damper there are provided two guide bars 24a and 24b for slidably guiding the damping mass 30. The guide bars 24a and 24b pass through spaced bores 33 provided in the damping mass 30 eccentrically with respect to the central axis thereof. The guide bars 24a and 24b also pass through and are in engagement with slide sleeves 33a and 33b situated in the two bores 33. Similarly to FIG. 1, spherical springs 40 and 50 may be arranged centrally with respect to the central axis of the damping mass 30.

In the embodiment illustrated in FIG. 3 there is provided an unequal number of spherical springs between the impact face 22 of the housing 20 and the impact face 31 of the damper mass 30 on the one hand and between the impact face 23 bounding the cavity of the housing 20 and the impact face 32 of the damping mass 30, on the other hand. This embodiment may be used for example, in a guide arrangement as shown in FIG. 2A.

Turning now to FIGS. 4A, 4B, 4C, 4D and 4E, the spring elements which form part of the vibration damper and which are, for example in FIG. 1 designated at 40 and 50, may have the shape of a sphere (FIG. 4A), a toroid (FIG. 4B), a rotational body derived from a lemniscate (FIG. 4C), a multiple spherical body having, for example, six cylindrical parts extending as Cartesian coordinates and terminating in arcuate (for example, hemispherical) surfaces (FIG. 4D) or a hexahedron complemented with two opposite spherical surfaces (FIG. 4E). The signficant common property of the differently shaped spring elements is that they have a dynamic behavior which corresponds to that of spherical bodies.

In order to be able to further vary the shape of the spring elements, the impact surfaces 22, 23 and 31, 32 may have different configurations. Thus, FIG. 5A shows a combination of convex and concave surfaces, FIG. 5B shows two convex surfaces, while FIG. 5C shows a convex and a planar surface. The spring elements arranged between such surface pairs may be composed of planar and arcuate faces since the particularly configured impact surfaces contribute to the spherical behavior of the spring elements.

In case the spring elements 40 or 50 are to be immobilized with respect to the housing 20 or the damping mass 30, expediently the envelope is of particular structure. Thus, as shown in FIG. 6A, the spring element may be secured to the damping mass 30 or the impact surfaces 22 or 23 bounding the housing 20 or the vibrating body 10 by means of a radially projecting pin forming an integral part of the envelope. As shown in FIG. 6B, as a variant, two diametrically opposite pins may be provided which may be inserted either into side walls of the housing or into mutually facing impact walls. A further variant is shown in FIG. 6C where the envelope includes diaphragm-like bands for suspending the spring elements at side walls of the housing. FIG. 6D shows an embedded nut by means of which the spring elements may be secured with a screw to one of the impact surfaces. FIG. 6E shows a string which is anchored in the envelope and which may be used for attaching the spring element as desired.

FIGS. 7A, 7B, 7C and 7D illustrate different constructions for the envelope surrounding the spring element. FIG. 7A shows an envelope closely surrounding the spring element, while FIG. 7B only has limited surface contacts at diametrically opposite locations of the spring element and otherwise loosely surrounds the same. Further, as shown in FIG. 7C, the envelope may be of an open flat structure with the flaps brought together and forced into a recess of the damping mass. By using two sheet-like envelope parts as shown in FIG. 7D, a securement of the spring element similarly to FIG. 6C may be achieved except that in the FIG. 7D embodiment the spring element is freely movable in a limited manner.

It will be understood that the above-described variants of spring elements, shapes of impact faces and means of securing and shaping the envelope may be combined with one another in a desired manner.

It will be understood that the above description of the present invention is susceptible to various modifications, changes and adaptations and the same are intended to be comprehended within the meaning and range of equivalents of the appended claims.

What is claimed is:

1. A vibration damper comprising
   (a) a housing defining a cavity;
   (b) two opposite wall surfaces bounding said cavity;
   (c) a damping mass accommodated in said cavity between said wall surfaces and arranged for oscillating along a path within said cavity; said damping mass having a central axis generally parallel with said path;
   (d) spring elements situated on two opposite side of said damping mass; each said spring element being in engagement with said damping mass and a respective one of said wall surfaces for positioning said damping mass in said cavity; each said spring element having a shape approximating a shere and being an elastomer having a low inherent damping property and high rebounding elasticity; each said spring element comprising a core body of polybutadiene and an at least partially closed flexible envelope being of an oil-resistant material; said spring elements, as viewed together, beig arranged at least approximately summetrically with respect to said central axis of said damping mass; and
   (e) sliding guiding means for guiding said damping mass linearly along said path.

2. A vibration damper as defined in claim 1, wherein said envelope is of chloroprene rubber.

3. A vibration damper as defined in claim 1, wherein said damping mass has a bore and said envelope has a pin-like extension projecting into said bore and further wherein said damping mass comprises securing means for clamping said pin-like extension in said bore.

* * * * *